(12) United States Patent
Kasper (10) Patent No.: US 11,938,856 B1
(45) Date of Patent: Mar. 26, 2024

(54) POWERED KAYAK STORAGE RACK (71) Applicant: Wade R. Kasper, Crocker, MO (US)

(72) Inventor: Wade R. Kasper, Crocker, MO (US)

( * ) Notice: Subject to any disclaimer, the term of this patent is extended or adjusted under 35 U.S.C. 154(b) by 0 days.

(21) Appl. No.: 18/141,984

(22) Filed: May 1, 2023

(51) Int. Cl.
*B60P 3/10* (2006.01)

(52) U.S. Cl.
CPC .............. *B60P 3/1066* (2013.01); *B60P 3/10* (2013.01); *B60P 3/1033* (2013.01)

(58) Field of Classification Search
CPC .......... B60P 3/10; B60P 3/1033; B60P 3/1066
See application file for complete search history.

(56) References Cited

U.S. PATENT DOCUMENTS

| | | | | |
|---|---|---|---|---|
| 3,718,227 A * | 2/1973 | Swift | .................... | B60P 3/1033 D12/94 |
| 4,221,420 A * | 9/1980 | Vencill | .................... | B60P 3/08 410/24 |
| 4,406,477 A * | 9/1983 | McDonald | .................... | B60P 3/08 296/26.05 |
| 4,420,165 A * | 12/1983 | Goodin | .................... | B60P 3/1033 280/414.1 |
| 4,469,346 A * | 9/1984 | Low | .................... | B60P 3/1033 414/495 |
| 4,589,814 A * | 5/1986 | Cates | .................... | B60P 3/1033 414/494 |
| 4,880,250 A * | 11/1989 | Cravens | .................... | B60P 3/08 410/6 |
| 4,932,830 A * | 6/1990 | Woodburn | .................... | B60P 3/1033 414/532 |
| 4,954,038 A * | 9/1990 | Sheahan | .................... | B60P 3/08 414/494 |
| 5,090,761 A * | 2/1992 | Renouard | .................... | B60P 3/1033 410/2 |
| 5,096,216 A * | 3/1992 | McCalla | .................... | B60P 3/1033 410/24 |
| 5,307,755 A * | 5/1994 | Lumpkin | .................... | B63B 59/02 114/364 |
| 5,468,115 A * | 11/1995 | Alvis | .................... | B60P 3/08 414/556 |
| 5,704,756 A * | 1/1998 | Marteney | .................... | B60P 1/02 414/495 |
| 5,772,388 A * | 6/1998 | Clark | .................... | B60P 3/08 414/494 |
| 5,863,173 A * | 1/1999 | Bremner | .................... | B60P 3/08 414/559 |
| 6,203,264 B1 * | 3/2001 | Combs, Sr. | .................... | B60P 3/1033 414/483 |

(Continued)

*Primary Examiner* — Jacob D Knutson
*Assistant Examiner* — Marlon A Arce
(74) *Attorney, Agent, or Firm* — Cramer Patent & Design PLLC; Aaron R. Cramer (57) ABSTRACT

The powered kayak storage rack comprises a kayak lifter that may be coupled to the front of a car hauler trailer. The kayak lifter may be operable to transport one or more kayaks. The kayak lifter may be operable to elevate the one or more kayaks above a trailer deck of the car hauler trailer such that one or more hauled vehicles, cargo, or both may be carried on the trailer deck beneath the one or more kayaks. The kayak lifter may comprise an upright support and a rack. The upright support may be a vertically oriented structure that couples to the front of the car hauler trailer. The rack may be a carrier for the one or more kayaks. The rack may be pivotably coupled to the upper half of the upright support.

16 Claims, 10 Drawing Sheets

(56) References Cited

U.S. PATENT DOCUMENTS

| | | | |
|---|---|---|---|
| 6,217,053 B1 * | 4/2001 | Forsythe | B60P 3/1058 |
| | | | 114/51 |
| 6,450,742 B1 * | 9/2002 | Jenkins | B60P 3/08 |
| | | | 410/24 |
| 6,457,619 B1 * | 10/2002 | Werner | B60R 9/08 |
| | | | 224/497 |
| 7,070,196 B1 | 7/2006 | Larsen et al. | |
| 7,097,408 B2 * | 8/2006 | Paxton | B60P 3/10 |
| | | | 224/504 |
| 7,143,713 B1 * | 12/2006 | Richardson | B60P 3/1033 |
| | | | 114/344 |
| 7,861,828 B1 * | 1/2011 | Shepard | B66F 7/0641 |
| | | | 187/218 |
| 8,302,986 B1 * | 11/2012 | Shilts | B63B 21/56 |
| | | | 280/414.1 |
| 8,800,831 B2 | 8/2014 | Gray | |
| 9,067,522 B2 | 6/2015 | Laverack et al. | |
| 9,440,576 B1 * | 9/2016 | Wierzba | B60P 3/08 |
| 9,550,445 B2 * | 1/2017 | Holmgren | B60P 1/04 |
| 9,771,249 B2 * | 9/2017 | Scott | B66F 7/025 |
| 10,046,711 B2 | 8/2018 | Zimmer | |
| 10,173,602 B2 | 1/2019 | Prelesnik | |
| 10,272,816 B1 * | 4/2019 | Watkins | B60P 3/07 |
| 10,322,266 B2 | 6/2019 | Lasley et al. | |
| 10,513,283 B2 | 12/2019 | Griffith | |
| 11,220,202 B1 | 1/2022 | Martin | |
| 11,292,701 B2 * | 4/2022 | Ferguson | B66C 23/44 |
| 2006/0182573 A1 * | 8/2006 | Taylor | B60P 1/02 |
| | | | 414/477 |
| 2009/0261136 A1 | 10/2009 | Skoff | |
| 2009/0267381 A1 * | 10/2009 | Huddleston | B63B 17/02 |
| | | | 114/361 |

\* cited by examiner

POWERED KAYAK STORAGE RACK

RELATED APPLICATIONS

None.

FIELD OF THE INVENTION

The present invention relates generally to a kayak storage rack and more specifically to a powered kayak storage rack.

BACKGROUND OF THE INVENTION

Recreational boating has earned a well-deserved spot of the list of favorite pastimes of countless people. The ability to get outside and enjoy warm weather, sunshine and water make all kinds of boating truly enjoyable. Many people turn to the use of a kayak to get out on the water especially when fishing, or just exploring local waterways and lakes when camping.

Unfortunately, even small versions of such watercraft must be transported by trailer or on the roof of a large car or truck. Those who may already be transporting an outdoor vehicle such as ATV's, dirt bikes, or the like on a trailer, may simply not have room for a kayak and either have to do without or rent a kayak at the location of use. This of course has a high cost, especially if kayaking is done on a frequent basis. Accordingly, there exists a need for a means by which kayaks can be transported simultaneously with outdoor vehicles in a manner which addresses the problems as described above. The development of the powered kayak storage rack fulfills this need.

SUMMARY OF THE INVENTION

To achieve the above and other objectives, the present invention provides for a powered kayak storage rack has a kayak lifter having an upright support and a rack. The upright support includes a left vertical support, a right vertical support, a top lateral support, a front support bracing, and a stopper bar. The rack includes a left rack rail and a right rack rail that are longitudinal oriented and parallel to each other and a front cross bar, a rear cross bar, and an intermediate cross bar that are laterally oriented and parallel to each other. The rack is pivotably coupled to an upper half of the upright support such that the rack pivots between a lowered position where one or more kayaks are loaded and unloaded and an elevated position, where the one or more kayaks are held above a plurality of cargo being transported on a trailer deck. The kayak lifter is adapted to be coupled to a front of a car hauler trailer and transport the one or more kayaks.

The kayak lifter may elevate the one or more kayaks above the trailer deck of the car hauler trailer such that one or more hauled vehicles and/or the cargo carried on the trailer deck is beneath the one or more kayaks. The left vertical support may be coupled to a left side of the car hauler trailer and the right vertical support is coupled to a right side of the car hauler trailer. The top lateral support may couple a top of the left vertical support to a top of the right vertical support. The top lateral support may include a plurality of eyelets for securing the one or more kayaks. The left vertical support and the right vertical support may elevate the rack above the trailer deck of the car hauler trailer.

The left vertical support may include a left support pivot aperture and the right vertical support includes a right support pivot aperture. The rack may pivotably couples to the upright support at the left support pivot aperture and the right support pivot aperture. The rack may be pivoted to the lowered position to load and unload the one or more kayaks and is pivoted to the elevated position to provide clearance on the trailer deck for the cargo. The rack may be detached from the upright support for clearance of the cargo carried on the trailer deck of the car hauler trailer. The rack may include a short kayak support to hold one or more short kayaks that are a length that prevents the one or more short kayaks from reaching from the intermediate cross bar to the rear cross bar.

The left vertical support may include a left support actuator coupler at a midpoint of a rear side of the left vertical support. The right vertical support may include a right support actuator coupler at a midpoint of a rear side of the right vertical support. A pair of actuators may be coupled to the upright support via the left support actuator coupler and the right support actuator coupler. The front support bracing couples may be between the front of the car hauler trailer and the upright support to stabilize the upright support. The front support bracing may couple to the upright support at a midpoint of the left vertical support and a midpoint of the right vertical support.

The stopper bar may be an armature that extends upward at an oblique angle from a front of the left vertical support, the right vertical support, or both. The stopper bar may be positioned to limit the pivoting motion of the rack by creating mechanical interference between the stopper bar and the rack as the rack pivots to the elevated position. The left rack rail may include a left rail pivot aperture disposed on the front one-quarter of the left rack rail that passes through the left rack rail laterally and the right rack rail includes a right rail pivot aperture located on the front one-quarter of the right rack rail that passes through the right rack rail laterally. A left pivot pin may pass through the left rail pivot aperture and through the left support pivot aperture on the left vertical support and a right pivot pin that passes through the right rail pivot aperture and through the right support pivot aperture on the right vertical support.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
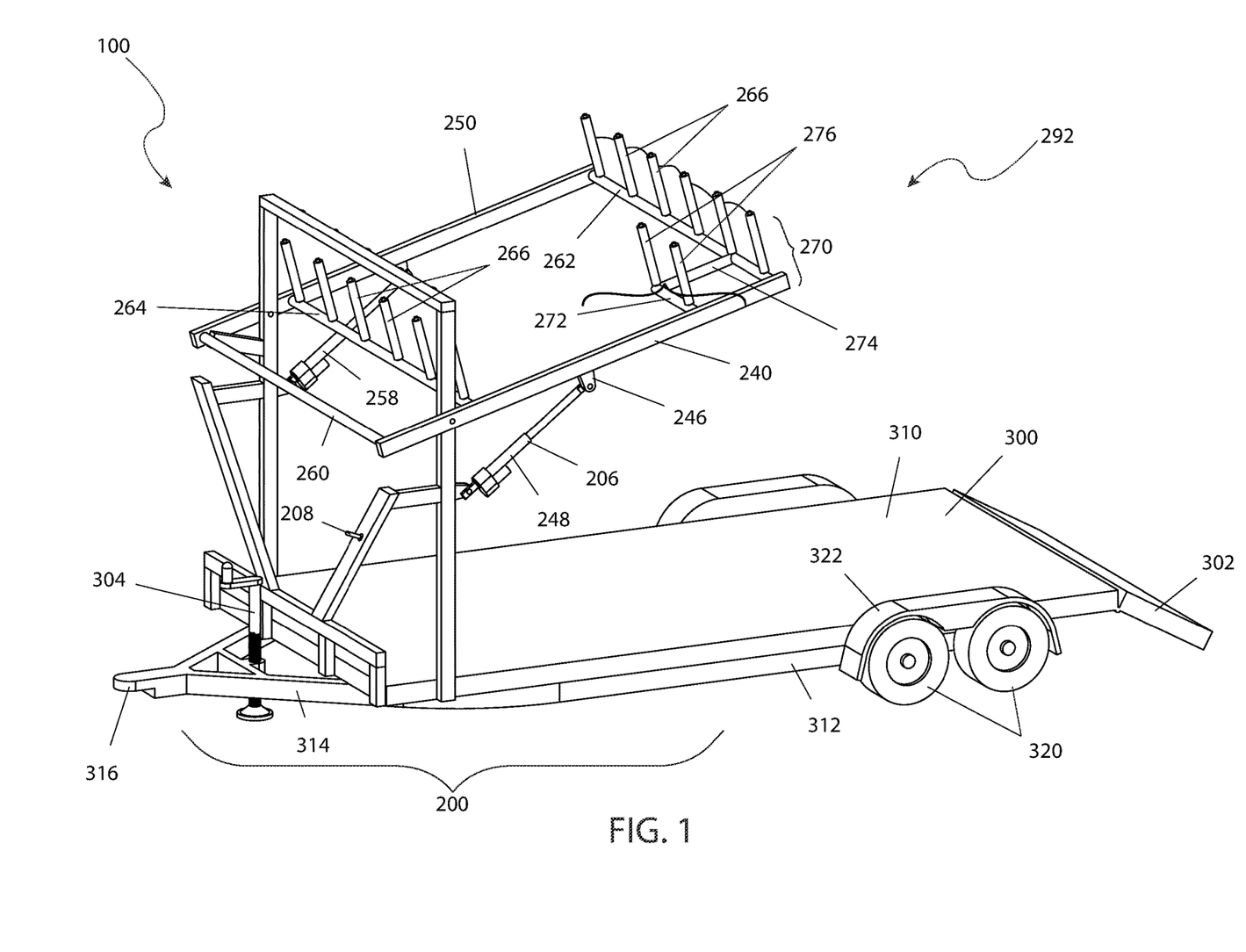
FIG. 1 is a front isometric view of a powered kayak storage rack, according to an embodiment of the present invention, illustrating the rack in the elevated position.
Figure 2:
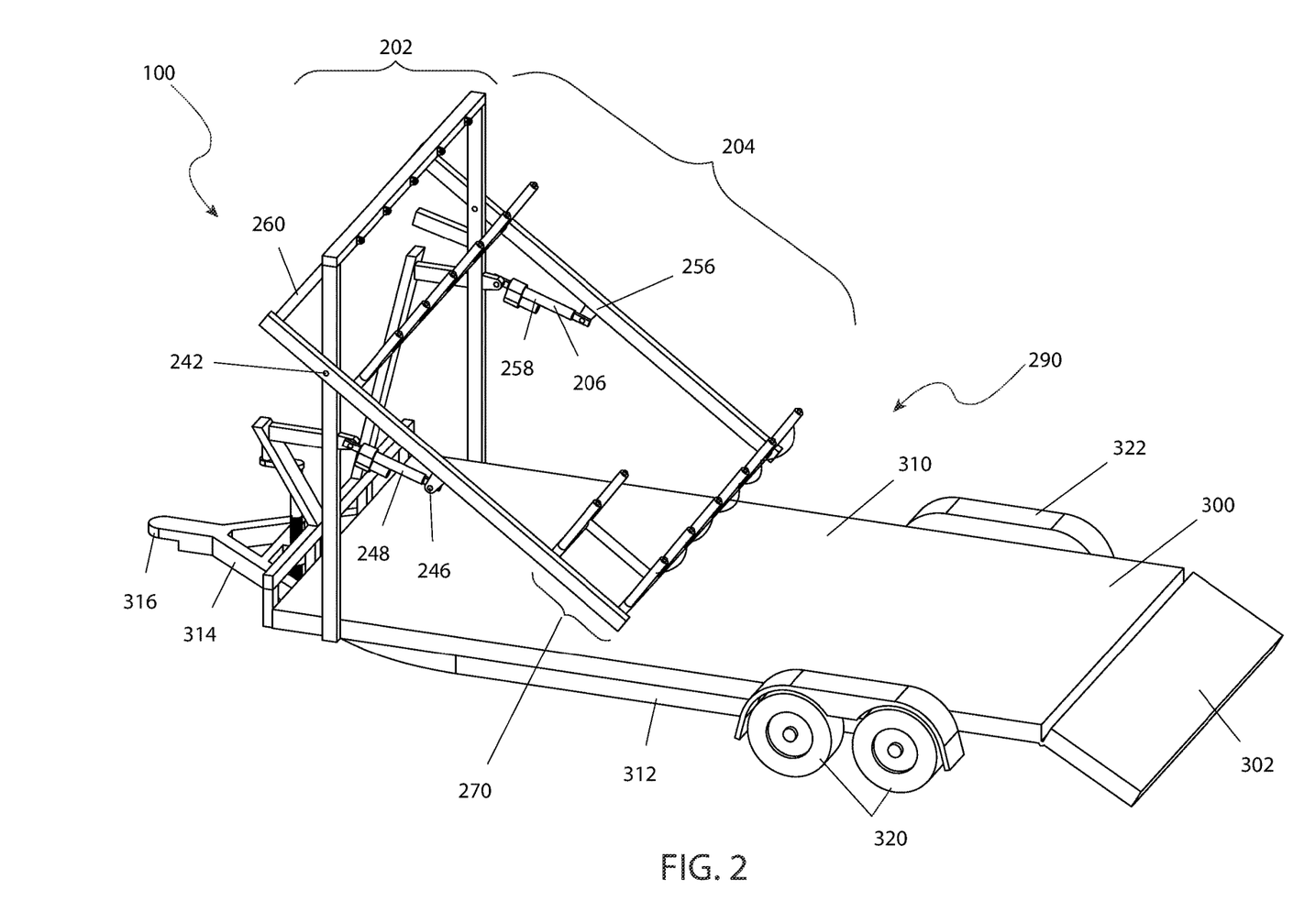
FIG. 2 is a rear isometric view of a powered kayak storage rack, according to an embodiment of the present invention, illustrating the rack in the lowered position.
Figure 3:
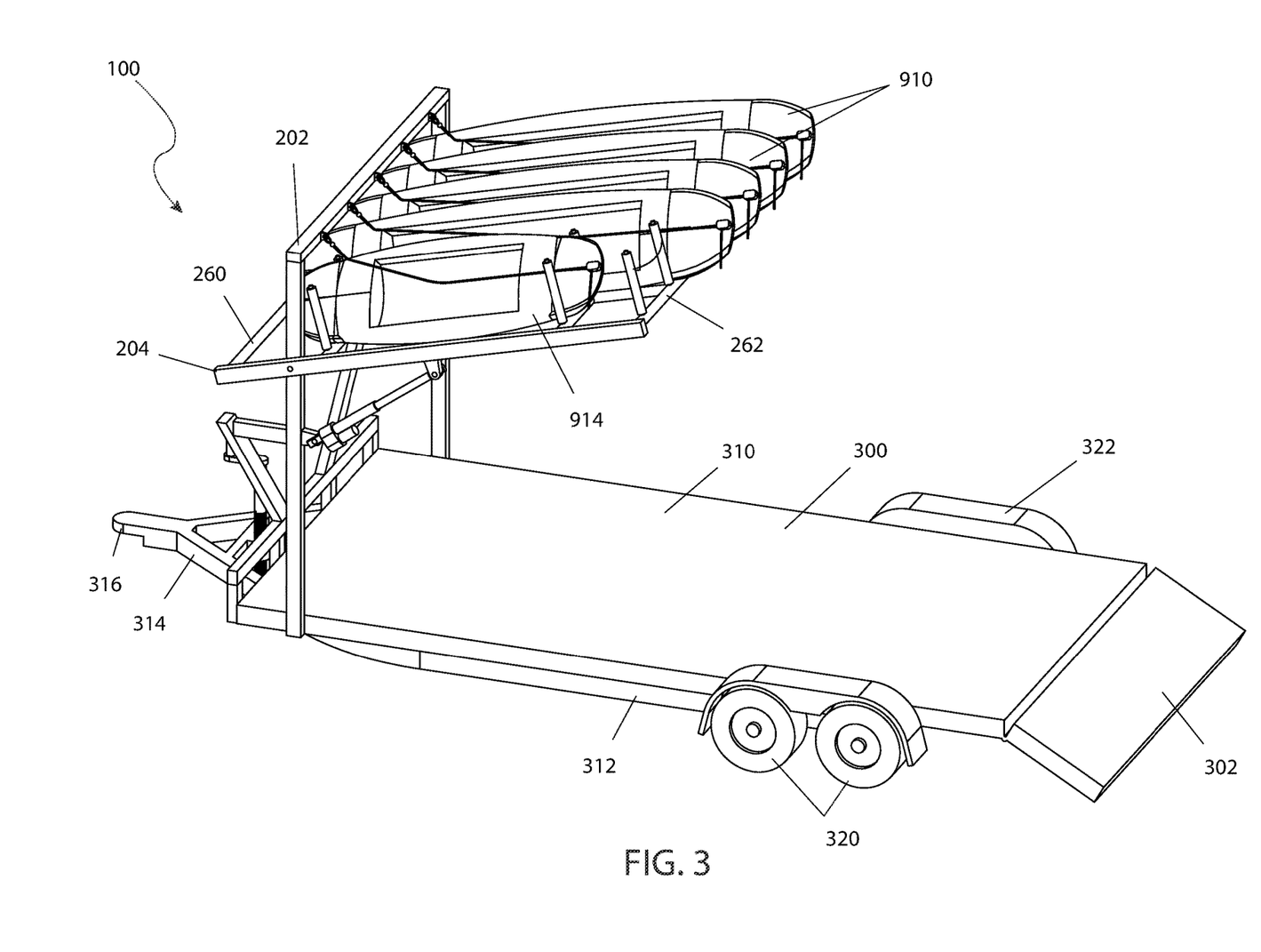
FIG. 3 is a rear isometric view of a powered kayak storage rack, according to an embodiment of the present invention, illustrating one (1) or more kayaks and one (1) or more short kayaks in place on the rack.
Figure 4:
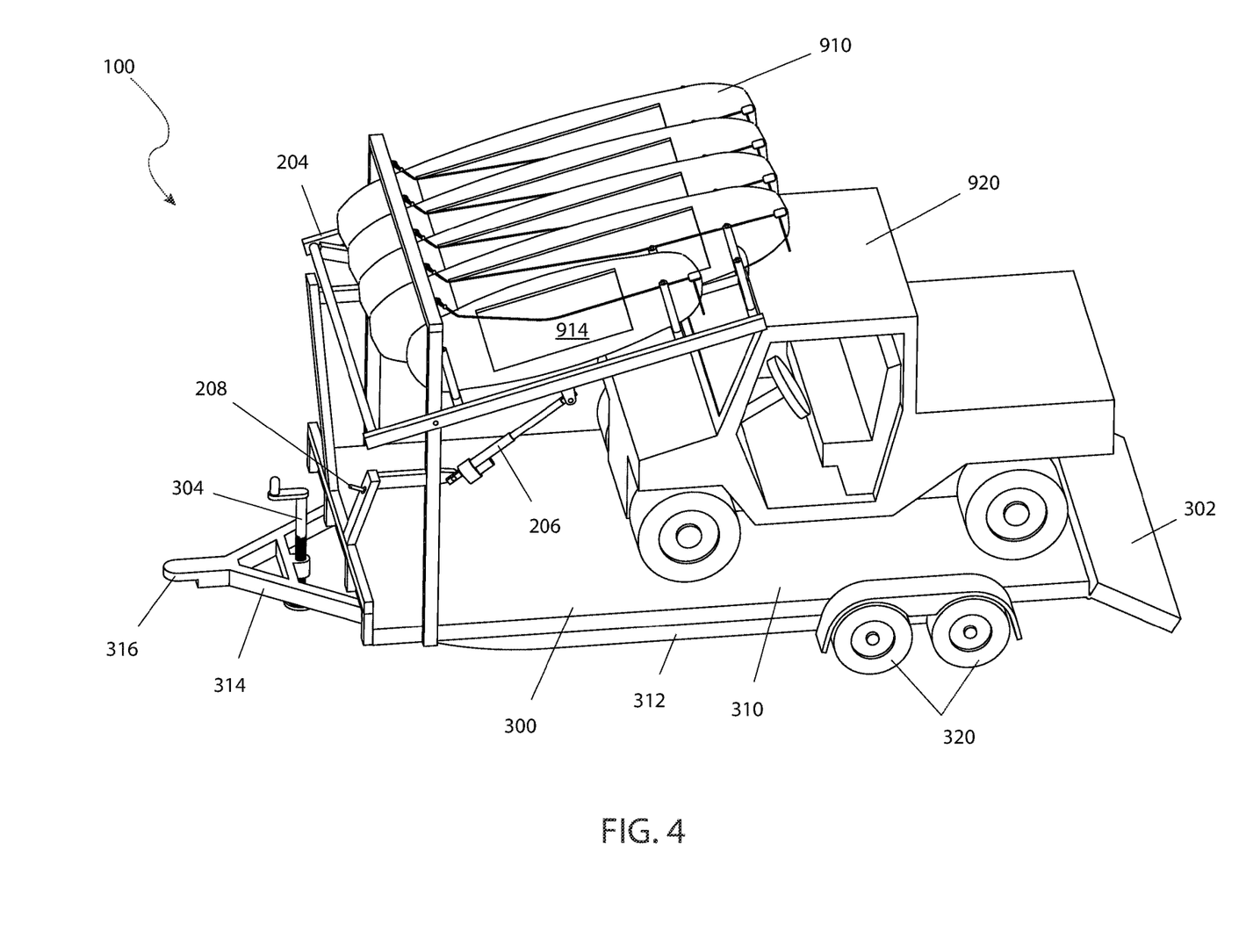
FIG. 4 is a top isometric view of a powered kayak storage rack, according to an embodiment of the present invention, illustrating one (1) or more kayaks and one (1) or more short kayaks in place on the rack.
Figure 5:
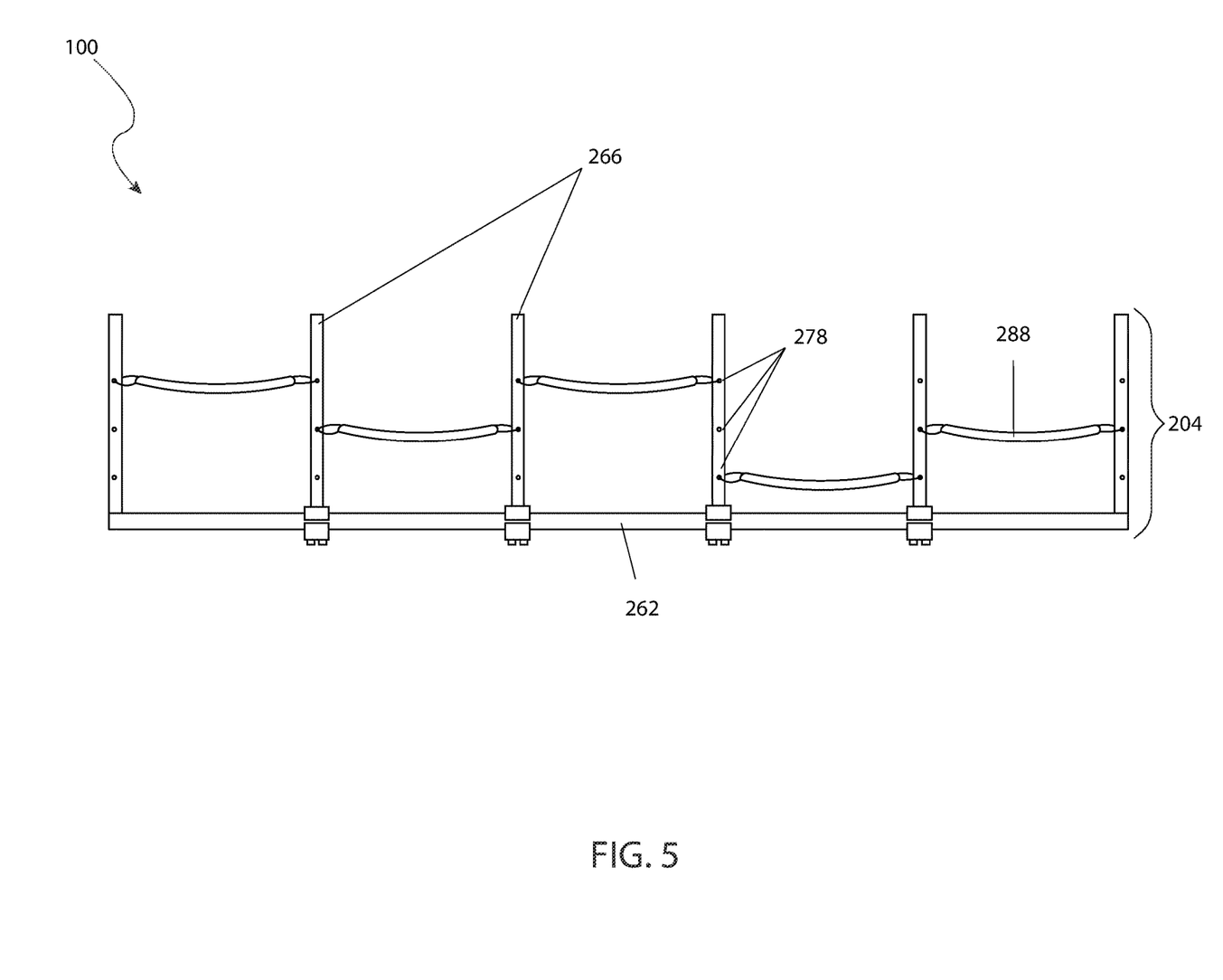
FIG. 5 is a rear view of a powered kayak storage rack, according to an embodiment of the present invention, illustrating the rack.
Figure 6:
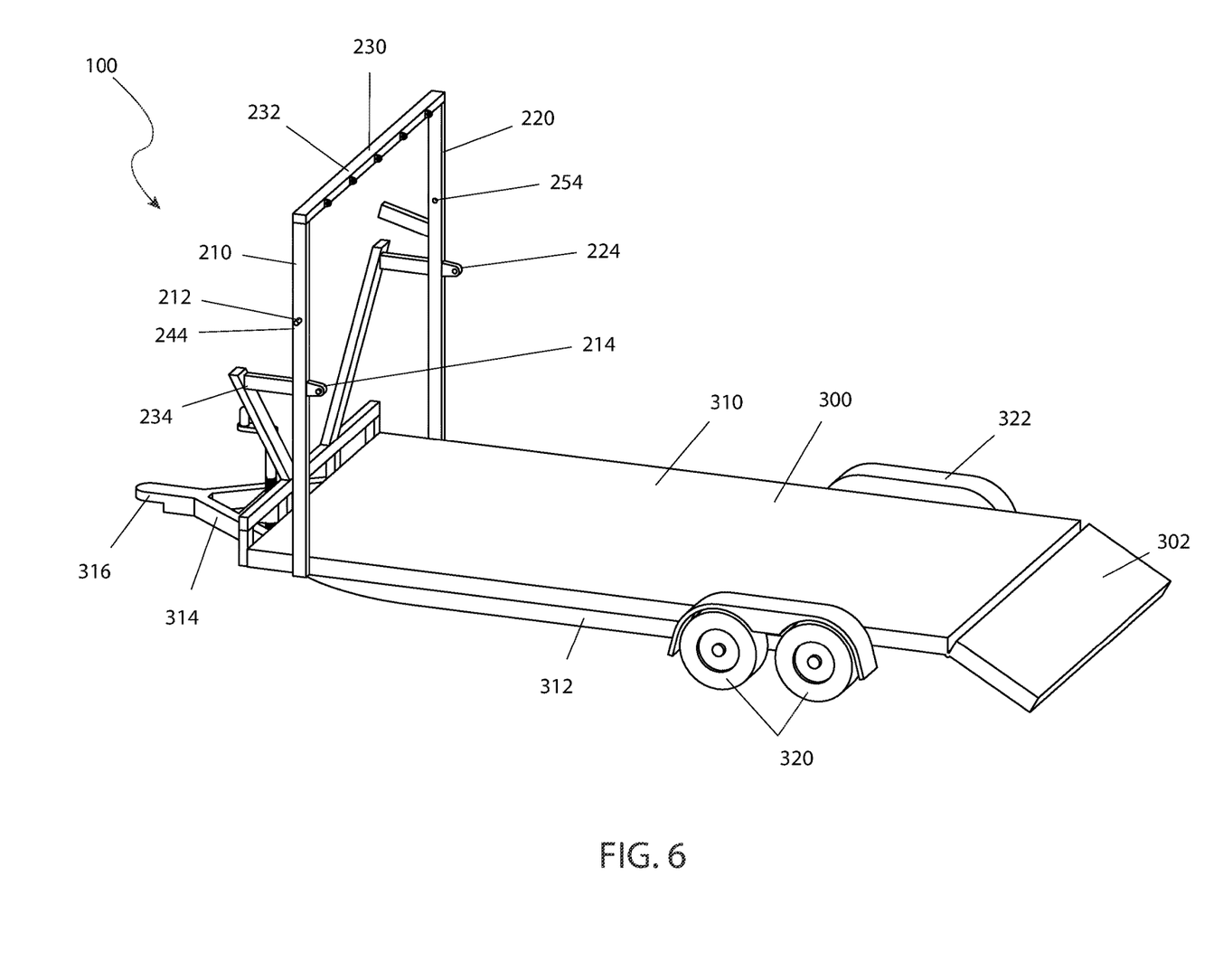
FIG. 6 is a rear left isometric view of a powered kayak storage rack, according to an embodiment of the present invention, illustrating the rack removed to clear space on the trailer deck.
Figure 7:
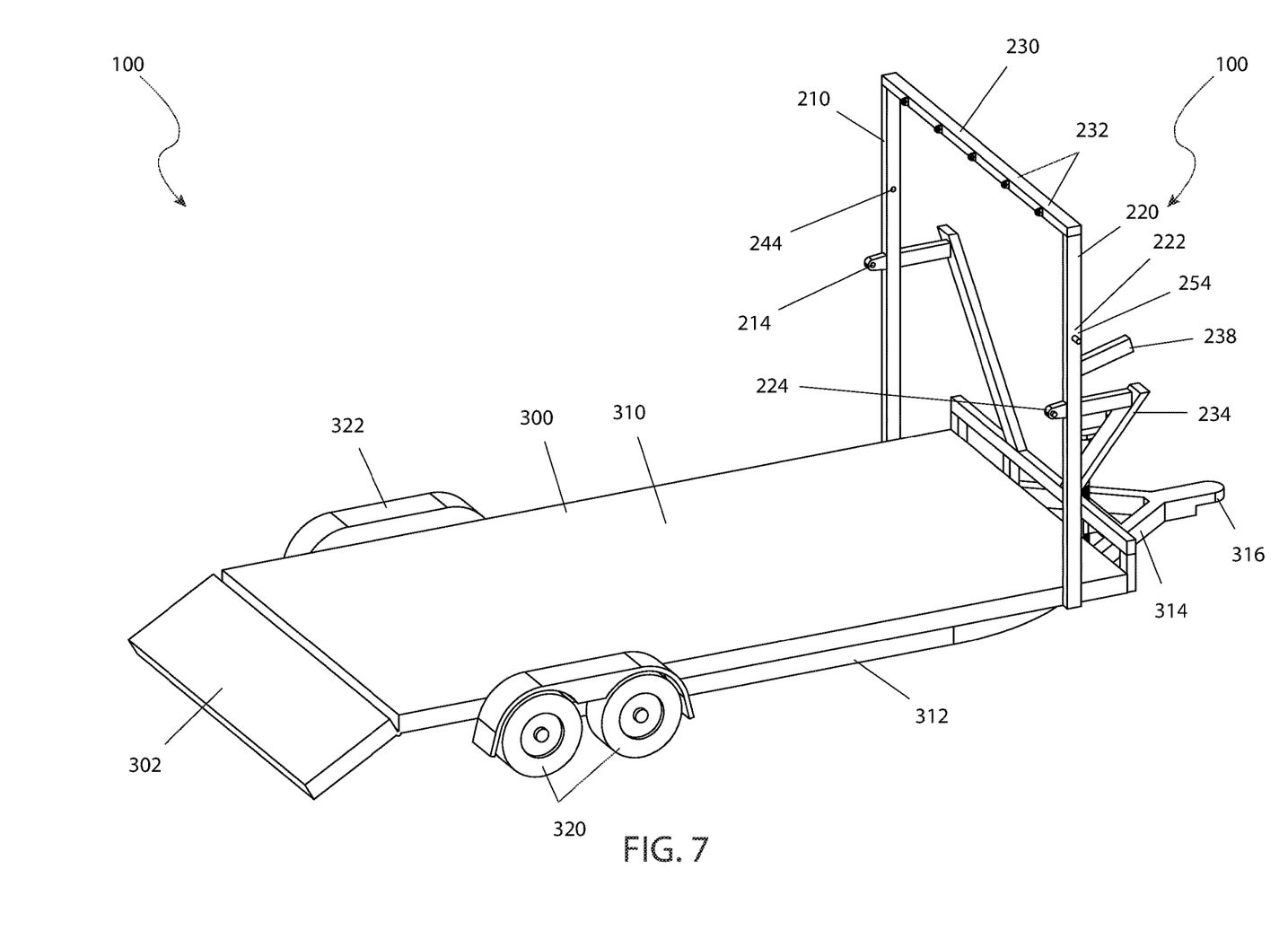
FIG. 7 is a rear right isometric view of a powered kayak storage rack, according to an embodiment of the present invention, illustrating the rack removed.
Figure 8:
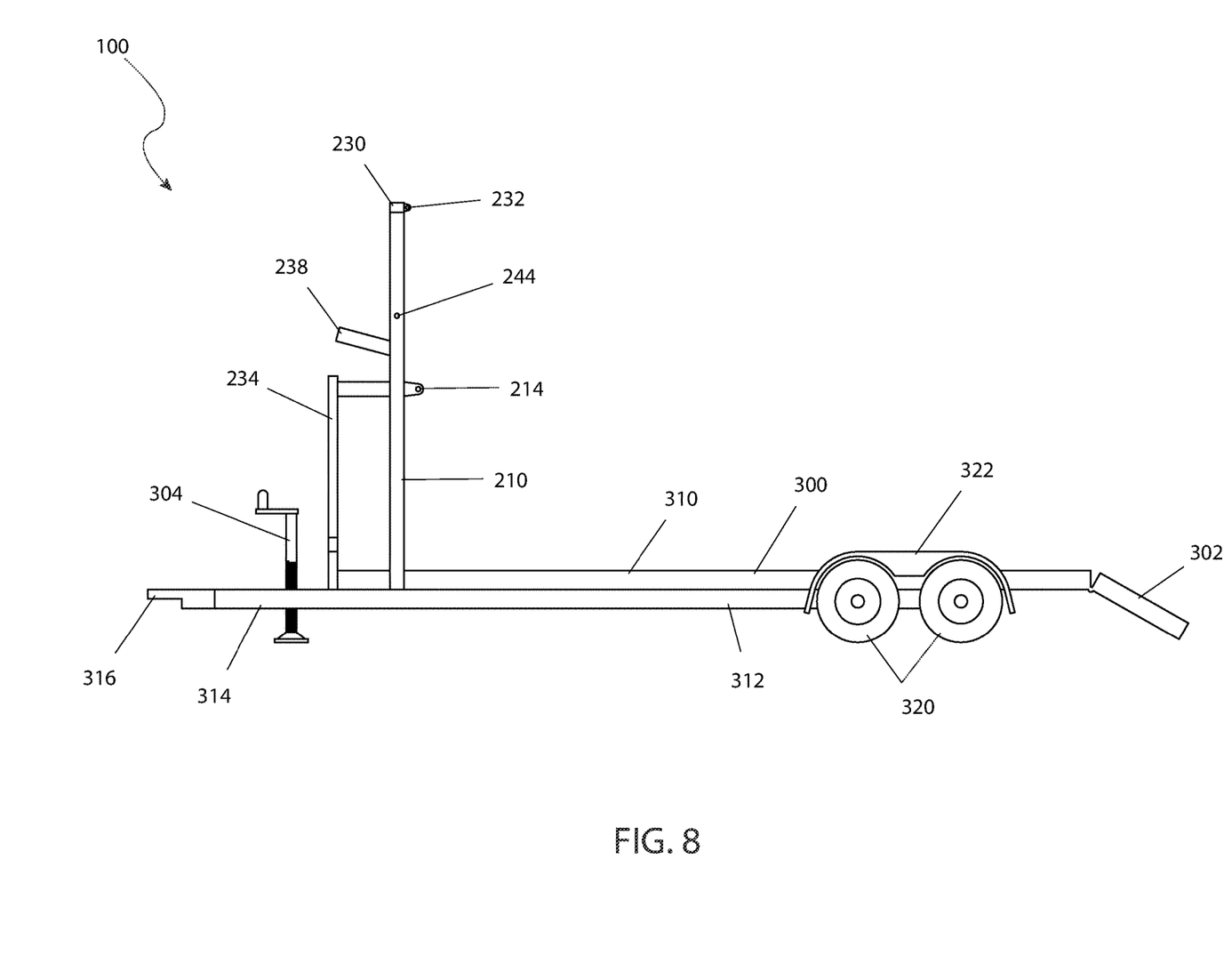
FIG. 8 is a side view of a powered kayak storage rack, according to an embodiment of the present invention, illustrating the rack removed.
Figure 9:
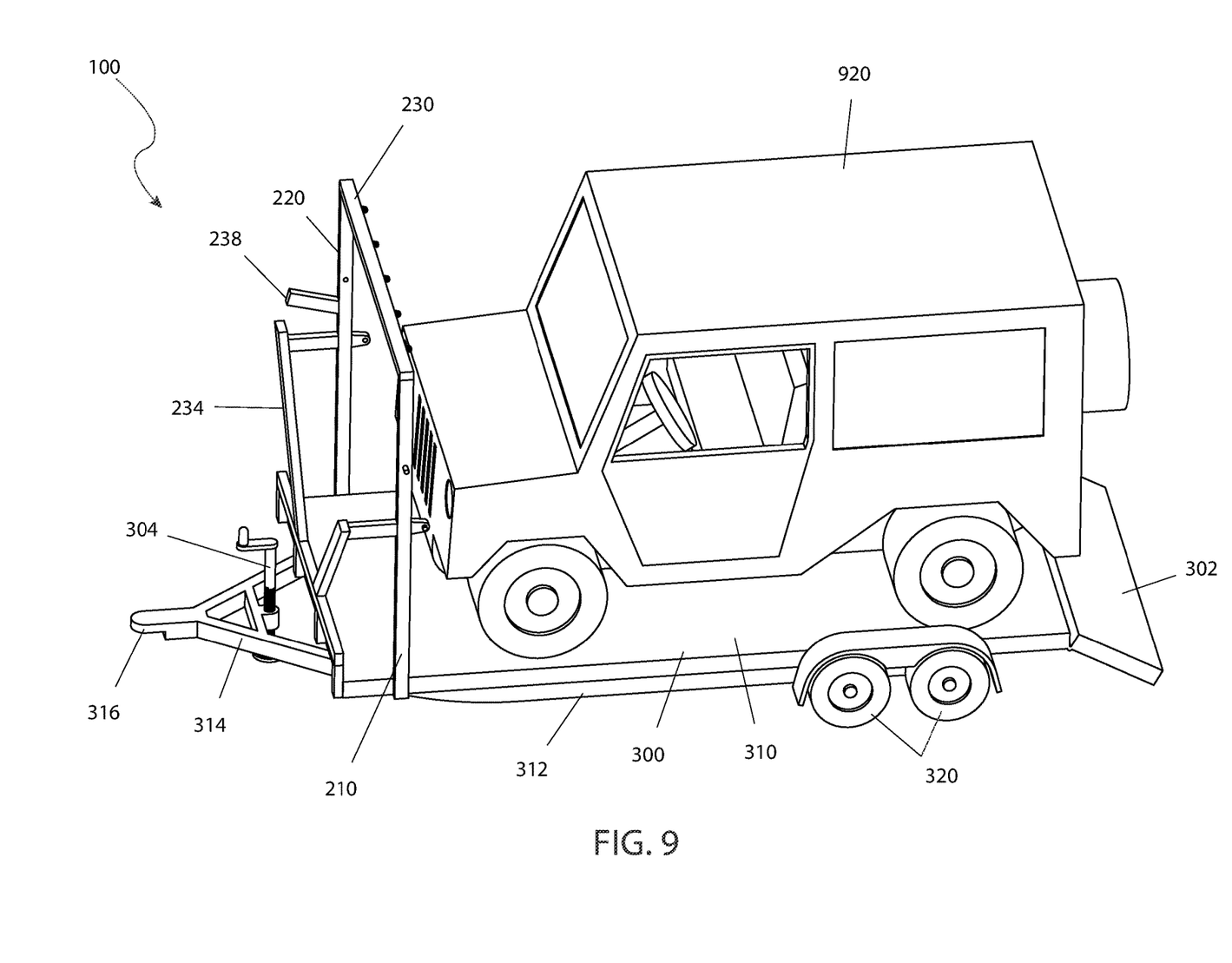
FIG. 9 is a top isometric view of a powered kayak storage rack, according to an embodiment of the present invention, illustrating the rack removed and a hauled vehicle loaded onto the car hauler trailer.
Figure 10:
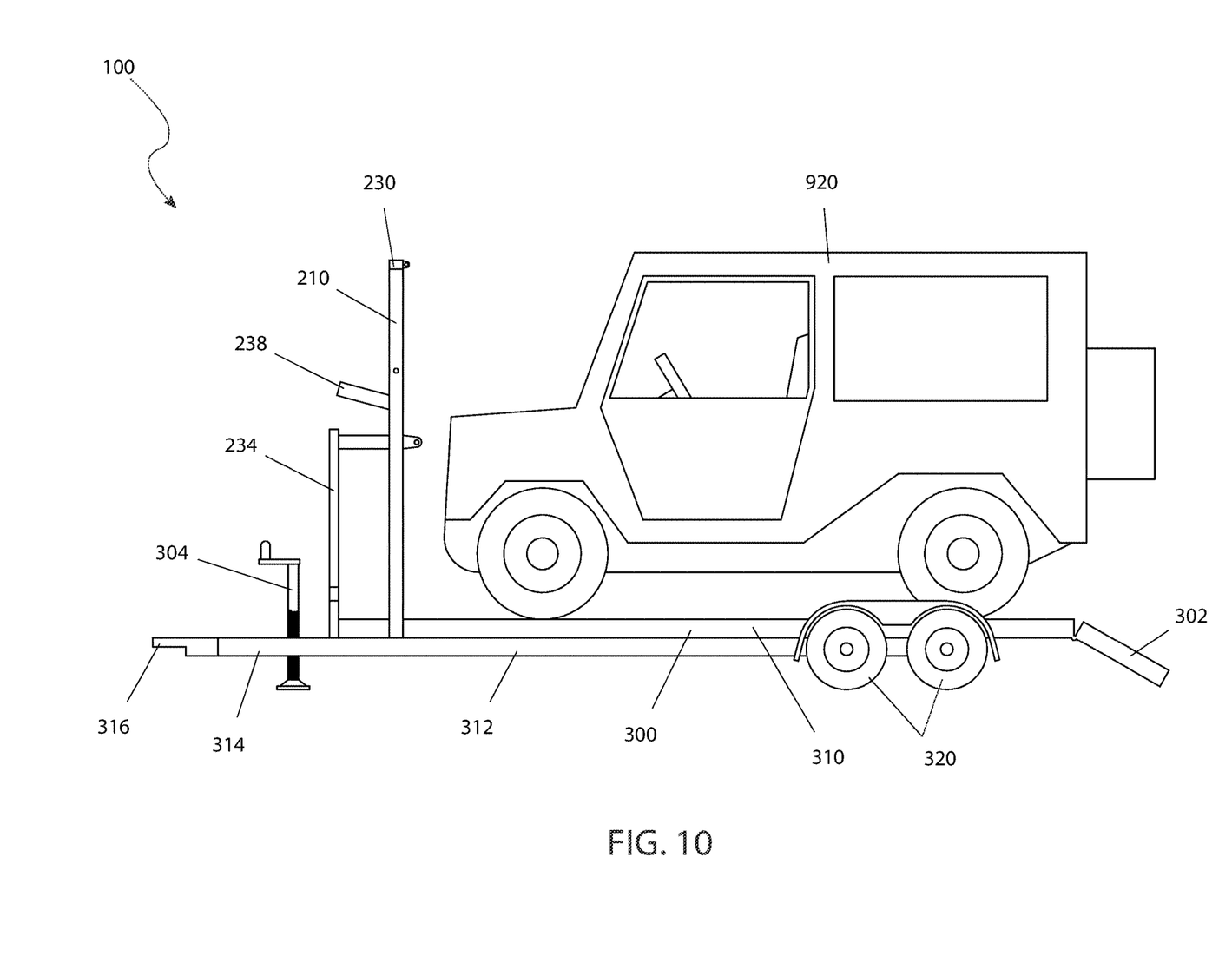
FIG. 10 is a side view of a powered kayak storage rack, according to an embodiment of the present invention, illustrating the rack removed and a hauled vehicle loaded onto the car hauler trailer.

DESCRIPTIVE KEY 100 powered kayak storage rack
200 kayak lifter
202 upright support
204 rack
206 actuator
208 rack control
210 left vertical support
212 left support pivot aperture
214 left support actuator coupler
220 right vertical support
222 right support pivot aperture
224 right support actuator coupler
230 top lateral support
232 eyelet
234 front support bracing
238 stopper bar
240 left rack rail
242 left rail pivot aperture
244 left pivot pin
246 left rail actuator coupler
248 left actuator
250 right rack rail
254 right pivot pin
256 right rail actuator coupler
258 right actuator
260 front cross bar
262 rear cross bar
264 intermediate cross bar
266 guidepost
270 short kayak support
272 short kayak lateral arm
274 short kayak longitudinal arm
276 short kayak guidepost
278 guidepost aperture
288 bungee cord
290 lowered position
292 elevated position
300 car hauler trailer
302 ramp
304 hitch jack
310 trailer deck
312 frame
314 tongue
316 coupler
320 tandem wheel
322 fenders
910 kayak
914 short kayak
920 hauled vehicle

DESCRIPTION OF THE INVENTION

The present invention is directed to a powered kayak storage rack (herein described as the "invention") 100. The invention 100 comprises a kayak lifter 200 that may be coupled to the front of a car hauler trailer 300. The kayak lifter 200 may be operable to transport one (1) or more kayaks 910. The kayak lifter 200 may be operable to elevate the kayaks 910 above a trailer deck 310 of the car hauler trailer 300 such that one (1) or more hauled vehicles 920, cargo, or both may be carried on the trailer deck 310 beneath the one (1) or more kayaks 910.

The kayak lifter 200 may comprise an upright support 202 and a rack 204. The upright support 202 may be a vertically oriented structure that couples to the front of the car hauler trailer 300. The rack 204 may be a carrier for the one (1) or more kayaks 910. The rack 204 may be pivotably coupled to the upper half of the upright support 202 such that the rack 204 may pivot between a lowered position 290 where the one (1) or more kayaks 910 may be loaded and unloaded and an elevated position 292 where the one (1) or more kayaks 910 may be held above the cargo being transported on the trailer deck 310.

The upright support 202 may comprise a left vertical support 210, a right vertical support 220, a top lateral support 230, front support bracing 234, and a stopper bar 238. The left vertical support 210 may be coupled to the left side of the car hauler trailer 300 and the right vertical support 220 may be coupled to the right side of the car hauler trailer 300. The left vertical support 210 and the right vertical support 220 may be positioned equidistant from the front of the car hauler trailer 300. The top lateral support 230 may couple the top of the left vertical support 210 to the top of the right vertical support 220. The top lateral support 230 may comprise an eyelets 232 for securing one (1) or more kayaks 910.

The left vertical support 210 and the right vertical support 220 may elevate the rack 204 above the trailer deck 310 of the car hauler trailer 300. The left vertical support 210 may comprise a left support pivot aperture 212 and the right vertical support 220 may comprise a right support pivot aperture 222. The rack 204 may pivotably couple to the upright support 202 at the left support pivot aperture 212 and the right support pivot aperture 222.

The left vertical support 210 may comprise a left support actuator coupler 214 at a midpoint of the rear side of the left vertical support 210. The right vertical support 220 may comprise a right support actuator coupler 224 at a midpoint of the rear side of the right vertical support 220. A pair of actuators 206 may couple to the upright support 202 via the left support actuator coupler 214 and the right support actuator coupler 224.

The front support bracing 234 may couple between the front of the car hauler trailer 300 and the upright support 202 to stabilize the upright support 202. The front support bracing 234 may couple to the upright support 202 at a midpoint of the left vertical support 210 and a midpoint of the right vertical support 220.

The stopper bar 238 may be an armature that extends upward at an oblique angle from the front of the left vertical support 210, the right vertical support 220, or both. The stopper bar 238 may be positioned to limit the pivoting motion of the rack 204 by creating mechanical interference between the stopper bar 238 and the rack 204 as the rack 204 pivots to the elevated position 292.

The rack 204 may be configured to hold one (1) or more kayaks 910 for transportation. The rack 204 may be repositionable by pivoting. The rack 204 may be pivoted to the lowered position 290 to load and unload one (1) or more kayaks 910 and may be pivoted to the elevated position 292 to provide clearance on the trailer deck 310 for the cargo. The rack 204 may be detached from the upright support 202 for clearance of the cargo carried on the trailer deck 310 of the car hauler trailer 300.

The rack 204 may comprise a left rack rail 240 and a right rack rail 250 that may be longitudinal oriented and parallel to each other. The rack 204 may further comprise a front cross bar 260, a rear cross bar 262, and an intermediate cross bar 264 that may be laterally oriented and parallel to each other. One (1) end of the front cross bar 260, the rear cross bar 262, and the intermediate cross bar 264 may be coupled to the left rack rail 240 and the opposing end of the front cross bar 260, the rear cross bar 262, and the intermediate cross bar 264 may be coupled to the right rack rail 250. The spacing between the left rack rail 240 and the right rack rail 250 may be determined by the front cross bar 260, the rear cross bar 262, and the intermediate cross bar 264.

The left rack rail 240 may comprise a left rail pivot aperture 242 located on the front one-quarter (¼) of the left rack rail 240 and passing through the left rack rail 240 laterally. The right rack rail 250 may comprise a right rail pivot aperture located on the front one-quarter (¼) of the right rack rail 250 and passing through the right rack rail 250 laterally. A left pivot pin 244 may pass through the left rail pivot aperture 242 and through the left support pivot aperture 212 on the left vertical support 210. A right pivot pin 254 may pass through the right rail pivot aperture and through the right support pivot aperture 222 on the right vertical support 220. The rack 204 may pivot around the left pivot pin 244 and the right pivot pin 254.

The left rack rail 240 may comprise a left rail actuator coupler 246 at a midpoint of the underside of the left rack rail 240. The right rack rail 250 may comprise a right rail actuator coupler 256 at a midpoint of the underside of the right rack rail 250. The pair of actuators 206 may couple to the rack 204 via the left rail actuator coupler 246 and the right rail actuator coupler 256.

The front cross bar 260 may be located at the front of the rack 204 and may be positioned to pass in front of the upright support 202. The rear cross bar 262 may be located at the rear of the rack 204 and may be positioned to pass in front of the upright support 202. The intermediate cross bar 264 may be located between the front cross bar 260 and the rear cross bar 262 and may be positioned to pass in front of the upright support 202.

An individual cross bar selected from the rear cross bar 262 and the intermediate cross bar 264 may comprise a plurality of guideposts 266. The guideposts 266 may be vertically oriented posts extending upwards from an individual cross bar. The plurality of guideposts 266 may be operable to define positions for one (1) or more kayaks 910 and to support one (1) or more kayaks 910 that being transported on the rack 204.

The pair of actuators 206 may pivot the rack 204 between the lowered position 290 and the elevated position 292. A left actuator 248 may be coupled between the left support actuator coupler 214 on the left vertical support 210 and the left rail actuator coupler 246 on the left rack rail 240. A right actuator 258 may be coupled between the right support actuator coupler 224 on the right vertical support 220 and the right rail actuator coupler 256 on the right rack rail 250.

The pair of actuators 206 may be wired into the electrical system of the car hauler trailer 300. The pair of actuators 206 may be electrically controlled by a rack control 208. The pair of actuators 206 may remain stationary when the rack control 208 is in a NEUTRAL position. The pair of actuators 206 may expand when the rack control 208 is in an UP position, thus causing the rack 204 to pivot upwards. The pair of actuators 206 may contract when the rack control 208 is in a DOWN position, thus causing the rack 204 to pivot downward. As non-limiting examples, in the NEUTRAL position the rack control 208 may electrically disconnect the pair of actuators 206 from the electrical system, in the UP position the rack control 208 may apply a voltage having a first polarity to the pair of actuators 206, and in the DOWN position the rack control 208 may apply a voltage having a second polarity to the pair of actuators 206 where the second polarity is the opposite of the first polarity.

In some embodiments, the rack 204 may comprise a short kayak support 270. The short kayak support 270 may be a section of the rack 204 that is operable to hold one (1) or more short kayaks 914 that are a length that prevents one (1) or more short kayaks 914 from reaching from the intermediate cross bar 264 to the rear cross bar 262. As a non-limiting example, the short kayak support 270 may comprise a short kayak lateral arm 272 that may be oriented to be parallel to the rear cross bar 262 and located between the rear cross bar 262 and the intermediate cross bar 264, a short kayak longitudinal arm 274 that may be oriented to be parallel to the left rack rail 240 and located between the left rack rail 240 and the right rack rail 250, and one (1) or more short kayak guideposts 276 that may be oriented to be parallel to the plurality of guideposts 266 coupled to the rear cross bar 262 and the intermediate cross bar 264.

The kayaks 910 may be carried on the rack 204 by placing opposing ends of one (1) or more kayaks 910 on the rear cross bar 262 and the intermediate cross bar 264 with support from the plurality of guideposts 266. The short kayaks 914 may be carried on the rack 204 by placing opposing ends of one (1) or more kayaks 910 on the short kayak lateral arm 272 and the intermediate cross bar 264 with support from the one (1) or more short kayak guideposts 276.

An individual guidepost selected from the plurality of guideposts 266 and one (1) or more short kayak guideposts 276 may comprise a plurality of guidepost apertures 278 to aid in securing one (1) or more kayaks 910. As non-limiting examples, one (1) or more kayaks 910 may be secured to the racks 204 using one (1) or more cables, one (1) or more cable fasteners, one (1) or more cable locks, one (1) or more cable tighteners, one (1) or more bungee cords 288 or any combination thereof.

The individual guidepost may be covered with foam in order to prevent scratching one (1) or more kayaks 910. The car hauler trailer 300 may be a non-powered vehicle that may be towed by a tow vehicle. The car hauler trailer 300 may comprise the trailer deck 310 that may be flat and sized to carry one (1) or more hauled vehicles 920 and/or the cargo. In some embodiments, the trailer deck 310 may be covered with a planking.

The car hauler trailer 300 may comprise a frame 312. As a non-limiting example, the frame 312 may be a metal framework around the periphery of the trailer deck 310 with support members running longitudinally and/or laterally. The front of the frame 312 may comprise a tongue 314 and a coupler 316 for detachably coupling to the tow vehicle.

The rear of the car hauler trailer 300 may comprise one (1) or more ramps 302 that may transition between the height of the trailer deck 310 and the ground such that one (1) or more hauled vehicles 920 may be loaded and unloaded. In some embodiments, the ramps 302 may be pivoting ramps that may pivot upwards when not in use.

The car hauler trailer 300 may comprise a hitch jack 304 to lift the coupler 316 off of the trailer hitch of the tow vehicle. The car hauler trailer 300 may comprise tandem wheels 320 coupled to the underside of the rear half of the car hauler trailer 300. The tandem wheels 320 may comprise two (2) axles that are parallel to each other. An individual axle may comprise a left side wheel and a right side wheel for a total of four (4) wheels.

In some embodiments, the left side wheel and the right side wheel may comprise brakes to assist in stopping the tow vehicle and the car hauler trailer 300. The tandem wheels 320 may comprise a suspension system to dampen vibrations from road hazards. As a non-limiting example, the suspension system may comprise leaf springs. The car hauler trailer 300 may comprise fenders 322 to prevent debris from being thrown by the wheels.

The electrical system of the car hauler trailer 300 may comprise a wiring harness, a trailer electrical connector, and a plurality of lights. The trailer electrical connector may detachably couple to the tow vehicle electrical connector. The wiring harness may distribute electrical signals from the trailer electrical connector to the plurality of lights. The plurality of lights may comprise brake lights, a left turn signal, a right turn signal, backup lights, side marker lights, a license plate light, or any combination thereof.

In use, the rack 204 may be pivoted to the lowered position 290 by moving the rack control 208 to the DOWN position. One (1) or more kayaks 910 may be secured to the rack 204 using one (1) or more cables, one (1) or more cable fasteners, one (1) or more cable locks, one (1) or more cable tighteners, one (1) or more bungee cords 288, or any combination thereof. The rack 204 may be pivoted to the elevated position 292 by moving the rack control 208 to the UP position. The process may be reversed in order to remove one (1) or more kayaks 910. One (1) or more hauled vehicles 920 and/or cargo may be stored on the trailer deck 310 of the car hauler trailer 300 beneath the rack 204 while the rack 204 is in the elevated position 292. The hauled vehicles 920 may be driven onto the trailer deck 310 using one (1) or more ramps 302. The rack 204 may be removed from the upright support 202, leaving only the upright support 202 coupled to the car hauler trailer 300, if necessary to accommodate the transportation of larger vehicles.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A powered kayak storage rack, comprising:
   a kayak lifter having an upright support and a rack;
   wherein the upright support includes a left vertical support, a right vertical support, a top lateral support, a front support bracing, and a stopper bar;
   wherein the rack includes a left rack rail and a right rack rail that are longitudinal oriented and parallel to each other and a front cross bar, a rear cross bar, and an intermediate cross bar that are laterally oriented and parallel to each other;
   wherein the rack is pivotably coupled to an upper half of the upright support such that the rack pivots between a lowered position where one or more kayaks are loaded and unloaded and an elevated position, where the one or more kayaks are held above a plurality of cargo being transported on a trailer deck;
   wherein the kayak lifter is adapted to be coupled to a front of a car hauler trailer and transport the one or more kayaks;
   wherein the front support bracing couples between the front of the car hauler trailer and the upright support to stabilize the upright support;
   wherein the front support bracing couples to the upright support at a midpoint of the left vertical support and a midpoint of the right vertical support;
   wherein the stopper bar is an armature that extends upward at an oblique angle from a front of the left vertical support, the right vertical support, or both; and,
   wherein the stopper bar is positioned to limit the pivoting motion of the rack by creating mechanical interference between the stopper bar and the rack as the rack pivots to the elevated position.

2. The powered kayak storage rack, according to claim 1, wherein the kayak lifter elevates the one or more kayaks above the trailer deck of the car hauler trailer such that one or more hauled vehicles and/or the cargo carried on the trailer deck is beneath the one or more kayaks.

3. The powered kayak storage rack, according to claim 1, wherein the left vertical support is coupled to a left side of the car hauler trailer and the right vertical support is coupled to a right side of the car hauler trailer.

4. The powered kayak storage rack, according to claim 1, wherein the top lateral support couples a top of the left vertical support to a top of the right vertical support.

5. The powered kayak storage rack, according to claim 1, wherein the top lateral support includes a plurality of eyelets for securing the one or more kayaks.

6. The powered kayak storage rack, according to claim 1, wherein the left vertical support and the right vertical support elevate the rack above the trailer deck of the car hauler trailer.

7. The powered kayak storage rack, according to claim 1, wherein the left vertical support includes a left support pivot aperture, and the right vertical support includes a right support pivot aperture.

8. The powered kayak storage rack, according to claim 7, wherein the rack pivotably couples to the upright support at the left support pivot aperture and the right support pivot aperture.

9. The powered kayak storage rack, according to claim 1, wherein the rack is pivoted to the lowered position to load and unload the one or more kayaks and is pivoted to the elevated position to provide clearance on the trailer deck for the cargo.

10. The powered kayak storage rack, according to claim 1, wherein the rack is detached from the upright support for clearance of the cargo carried on the trailer deck of the car hauler trailer.

11. The powered kayak storage rack, according to claim 1, wherein the rack includes a short kayak support to hold one or more short kayaks that are a length that prevents the one or more short kayaks from reaching from the intermediate cross bar to the rear cross bar.

12. The powered kayak storage rack, according to claim 1, wherein the left vertical support includes a left support actuator coupler at a midpoint of a rear side of the left vertical support.

13. The powered kayak storage rack, according to claim 12, wherein the right vertical support includes a right support actuator coupler at a midpoint of a rear side of the right vertical support.

14. The powered kayak storage rack, according to claim 13, further comprising a pair of actuators coupled to the upright support via the left support actuator coupler and the right support actuator coupler.

15. The powered kayak storage rack, according to claim 1, wherein the left rack rail includes a left rail pivot aperture disposed on the front one-quarter of the left rack rail that passes through the left rack rail laterally and the right rack rail includes a right rail pivot aperture located on the front one-quarter of the right rack rail that passes through the right rack rail laterally.

16. The powered kayak storage rack, according to claim 15, further comprising a left pivot pin passes through the left rail pivot aperture and through the left support pivot aperture on the left vertical support and a right pivot pin that passes through the right rail pivot aperture and through the right support pivot aperture on the right vertical support.

* * * * *